T. B. WILLIAMS.
MACHINE FOR FACING VALVES, &c.
APPLICATION FILED MAR. 18, 1908.
913,085.
Patented Feb. 23, 1909.
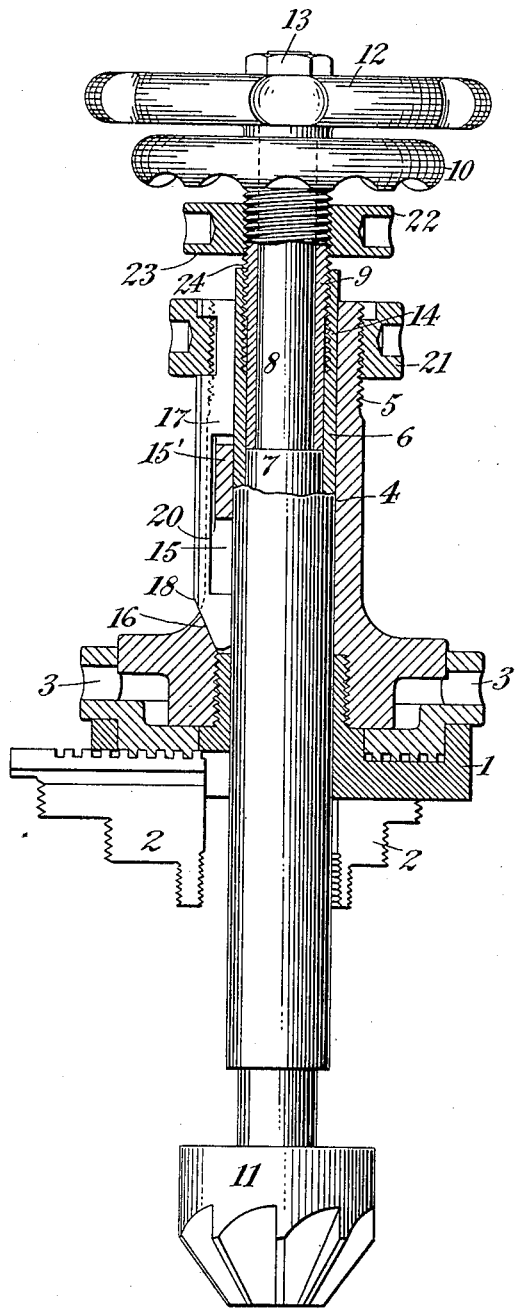

UNITED STATES PATENT OFFICE.

THOMAS B. WILLIAMS, OF ORANGE, MASSACHUSETTS, ASSIGNOR TO LEAVITT MACHINE COMPANY, OF ORANGE, MASSACHUSETTS, A CORPORATION OF MASSACHUSETTS.

MACHINE FOR FACING VALVES, &c.

No. 913,085.     Specification of Letters Patent.     Patented Feb. 23, 1909.

Application filed March 18, 1908. Serial No. 421,818.

*To all whom it may concern:*

Be it known that I, THOMAS B. WILLIAMS, a citizen of the United States, and resident of Orange, in the county of Franklin and State of Massachusetts, have invented certain new and useful Improvements in Machines for Facing Valves, &c., of which the following is a specification.

This invention relates to a machine for facing valves, etc., and particularly to such a facing machine in which the tool-spindle is so combined with the other parts of the machine as to be capable of quick adjustment in the direction of its length, while capable of fine adjustment by suitable means for the purpose of feeding a tool gradually up to or away from the work.

The present invention is in the nature of an improvement upon that disclosed in a patent granted to me September 10th, 1907, No. 865,739, in which there is illustrated a facing machine of the same general type, in which the tool-spindle is threaded into a bearing-sleeve mounted in a tubular extension of the body of the machine and slidable in such tubular member to bring a cutting tool with its spindle quickly up to or away from the work. The present invention is distinguished from that disclosed in my prior patent by the provision of an alternative type of means for holding and releasing the bearing-sleeve to hold it firmly in place or permit quick and great adjustment thereof, as may be desired, and also by the provision of improvements in the means for effecting the fine adjustment of the spindle and the tool carried thereby, such fine adjusting means being an alternative type to that disclosed in my said patent. The principal feature which distinguishes the quick-adjustment mechanism of my present machine from that disclosed in said prior patent is a wedging device for holding and releasing the bearing sleeve which carries the tool-spindle, this wedging device being preferably carried by and movable longitudinally of the tubular member of the fixed part of the machine and having an actuating nut for moving it in one direction or the other on said tubular member.

The principal feature of that part of my invention which relates to the fine adjustment of the spindle and a cutting tool carried thereby, is the substitution for a frictional device for rendering it more or less difficult to feed the spindle by bringing a split threaded member more or less firmly into engagement with corresponding screw-threads on a spindle, of positive stopping means for determining with precision the exact extent of the fine feed of the spindle which may be desired at any given time. This positive control is obtained in the machine illustrated in this case by a stop-nut threaded on the spindle and movable into or out of contact with the free upper end or cheek of the bearing spindle.

The drawing illustrates in central longitudinal section and elevation a machine embodying the present invention and having a cutting tool applied to the spindle thereof.

In the embodiment of my present invention herein shown I have illustrated a modified type of the valve-facing machine shown in my prior patent before referred to, but while this invention is especially adapted for use in connection with a machine of that type, it is not limited to any particular construction of valve-facing machine in which it is possible to embody the quick-adjustment feature set forth in said patent.

The machine shown is constructed, as is usual, so as to be readily attachable to and detachable from valve-casings connected up in the pipes of water, steam and other systems, and it has clamping means preferably embodying a chuck with adjustable jaws, fitting different sizes of openings, for engaging valve casings. The main member of such a machine is ordinarily a chuck, such as 1, having adjustable radially-movable jaws, such as 2, which may be moved in and out by means of an adjusting-ring 3 in a manner well understood. This chuck constitutes the body of the machine and forms the principal support for the other parts, and particularly for the main spindle and a cutter carried thereby. Here the chuck has the usual tubular member 4 projecting therefrom, which in this case may be externally screw-threaded at its free end at 5. Internally this tubular member is so constructed as to permit a cylindrical or equivalent spindle-carrying member or sleeve, such as 6, to slide freely therein in the direction of its length when not held by some suitable means. The spindle which this bearing or sleeve 6 serves to support for rotation is indicated at 7. It passes through the sleeve 6, which in turn extends through the chuck at one end and through the tubular member 4 at the other end. At its upper end the spindle is reduced at 8, and on this reduced portion is journaled a relatively long sleeve 9, to the upper end of which is secured a hand-wheel 10, by means of which the sleeve 9 is turned and which normally serves to impart a slow or fine feed-movement to the spindle 7 and to a cutter, such as 11, secured to the lower end of the spindle. The sleeve 9 and the hand-wheel 10 are held in a fixed position lengthwise of the spindle between the shoulder formed by the reduced portion thereof and another hand-wheel 12 at the upper end of the spindle. This latter hand-wheel serves to turn the spindle without imparting feed movement thereto, and is held in place by a suitable stop, such as the nut 13.

Most of the parts just described are of well-known construction and coact in a manner that is well understood. The tubular bearing member 4, however, is not split in this case at its free end, as it is in the machine shown in my prior patent, nor is the sleeve 6, which slides therein, so split. Instead, both of these parts are made solid, the latter being merely internally screw-threaded at its upper end at 14 for engagement with the external threads of the feed-sleeve 9, while the former is externally threaded at 5, as before stated, and also preferably has a deep longitudinal slot intersecting the inner wall thereof throughout the major portion of its length, for the purpose of receiving a wedging device for holding the sleeve 6 firmly in any desired longitudinal position. The bearing member 4 also preferably has an inclined face for coöperation with the wedging device.

The principal function of the wedging device and its associated parts is to permit the adjustable bearing and the spindle carried thereby to be quickly clamped or released, as may be desired. In the preferred construction, shown in the drawing, this wedging device is substantially in the form of a flat key fitting the slot before referred to that is cut in the tubular member 4. This slot extends nearly from end to end of the tubular member 4 and is indicated at 15, partly interrupted near its center by a ridge-piece 15' of the tubular member, which is not cut away at this point. At its inner end it is partly closed by an inclined wall, such as 16, which coöperates with one of the operating faces of the wedge. This wedge may be of the type shown, and is designated generally by 17, it being a rather long but thin key-shaped piece substantially filling the slot or key-way 15 and having at one end thereof a wall 18 inclined to its inner edge, which inner edge when wedged in place is in contact with the outer surface of the bearing-sleeve 6. In order that the wedging device 17 may grip the sleeve firmly when the device is forced home, the part 17 preferably has two separated bearing surfaces with an intermediate cut-away portion, such as indicated at 20. The device 17 should project but slightly beyond the periphery of the tubular member 4, in order that it may not be in the way. The wedge may be forced home between the bearing-sleeve to be gripped and the inclined resistance wall 16 on the tubular member 4 by any suitable means and held there in any way. Preferably, however, it is operated by a nut, such as 21, which in this case coacts with the screw-threads 5 of the tubular member and is connected with the wedging device 17, when the parts are assembled, in such a manner as to positively actuate said device in both directions. The nut and the wedging device are both shown as cut away to permit the part 17 to be fed with and by the nut 21, and so as to permit turning of the nut while preventing turning of the wedging device, the two parts being so combined that their outer ends are in the same plane and the wedge does not project.

It will be clear from the construction illustrated that by merely turning the nut 21 in one direction or the other the sleeve 6 with its spindle may be instantly clamped in any desired longitudinal position, or released so that it can be quickly slid to a new position. For obtaining the fine feed of the spindle, after the quick great adjustment has been obtained by means just described, I prefer to employ positive stop faces, which may be of the type shown. In this case the upper end of the sleeve 6 itself constitutes one of these stops, and a complementary stop-face is provided, preferably on the feed-sleeve 9. This complementary stop-face is here shown as embodied in a stop-nut 22 on the threaded portion of the sleeve 9 and between the hand-wheel 10 and the adjacent end of the sleeve 6. Obviously this stop-nut has only a limited range of movement. When turned so that the stop-face 23 is out of contact with the complementary stop-face or cheek 24 of the sleeve 6, it will be evident that on the advance of the spindle by the turning of the wheel 10 the movement of the spindle will be stopped positively the moment the stop-face 23 strikes the stop-face 24, and that further feed movement of the spindle will be prevented until the stop-nut is loosened and moved away from the face 24.

The manner in which the main feed movement or adjustment of the spindle of such a tool and the fine feed movement of said spindle are utilized for facing valve-seats by the application of the machine to fixed valve casings, is now well understood, and the machine shown herein is applicable for facing various styles and sizes of valve-seats located at different depths in the valve-casings in which said seats may be contained.

What I claim is:

1. A machine for facing valves, etc., embodying clamping means for engaging a valve-casing, a spindle extending beyond the clamping means, a spindle-bearing slidable in said clamping means, a wedging device for fastening the bearing in a stationary position, and means for making effective said wedging device by sliding it.

2. A machine for facing valves, etc., embodying clamping means for engaging a valve-casing, a spindle extending beyond the clamping means, a spindle-bearing slidable in said clamping means, a wedging device extending lengthwise of the machine for fastening the bearing in a stationary position, and means for making effective said wedging device by sliding it in the direction of its length.

3. A machine for facing valves, etc., embodying clamping means for engaging a valve-casing said clamping means embodying a tubular member, a spindle extending beyond the clamping means, a spindle-bearing slidable in said tubular member, a wedging device carried by said tubular member for fastening the bearing in a stationary position, and means for making effective said wedging device by sliding it on the tubular member.

4. A machine for facing valves, etc., embodying clamping means for engaging a valve-casing said clamping means embodying a tubular member, a spindle extending beyond the clamping means, a spindle-bearing slidable in said tubular member, a wedging device extending lengthwise of the machine for fastening the bearing in a stationary position, and a nut on the tubular member for making effective said wedging device by sliding said device in the direction of its length.

Signed at Orange, in the county of Franklin, and State of Massachusetts, this 11th day of March, 1908.

THOMAS B. WILLIAMS.

Witnesses:
FRED A. DEXTER,
CARL B. CARRUTH.